United States Patent

Russell et al.

[11] Patent Number: 5,915,050
[45] Date of Patent: Jun. 22, 1999

[54] OPTICAL DEVICE

[75] Inventors: Philip St John Russell, Chandler's Ford; Timothy Adam Birks, Southampton; Christopher Noel Pannell, Canterbury, all of United Kingdom

[73] Assignee: University of Southampton, Hampshire, United Kingdom

[21] Appl. No.: 08/693,268

[22] PCT Filed: Feb. 17, 1995

[86] PCT No.: PCT/GB95/00340

§ 371 Date: Dec. 30, 1996

§ 102(e) Date: Dec. 30, 1996

[87] PCT Pub. No.: WO95/22783

PCT Pub. Date: Aug. 24, 1995

[30] Foreign Application Priority Data

Feb. 18, 1994 [GB] United Kingdom ............... 9403122

[51] Int. Cl.[6] .................................................. G02B 6/10
[52] U.S. Cl. ............................. 385/7; 385/43; 385/96; 385/42
[58] Field of Search .................. 385/12, 13, 7, 385/42, 43, 48, 50, 95, 96

[56] References Cited

U.S. PATENT DOCUMENTS 5,345,522  9/1994  Vali et al. ................................. 385/12
5,379,357  1/1995  Sentsui et al. ............................ 385/7

FOREIGN PATENT DOCUMENTS 0144190  6/1985  European Pat. Off. .
0178806  4/1986  European Pat. Off. .
0230369  7/1987  European Pat. Off. .

OTHER PUBLICATIONS

T.A. Birks, et al.; "Four-port fiber frequency shifter with a null taper coupler" Optics Letters/vol. 19, No.23/Dec. 1, 1994; pp. 1964–1966.

*Primary Examiner*—Hung N. Ngo
*Attorney, Agent, or Firm*—Renner, Otto, Boisselle & Sklar, P.L.L.

[57] ABSTRACT

An optical device comprises an optical fiber directional coupler having at least a first optical fiber optionally coupled at a coupling region to a second optical fiber such that light can propagate in the coupling region in at least two possible electromagnetic transmission modes; and means for transferring energy between the modes by a spatially periodic perturbation of at least a part of coupling region.

31 Claims, 8 Drawing Sheets

OPTICAL DEVICE

FIELD OF THE INVENTION

This invention relates to optical devices.

DESCRIPTION OF THE RELATED ART

Acousto-optic devices have been proposed for use as optical frequency shifters, tunable filters, optical switches and optical modulators. These devices make use of an interaction between light passing through a transmission medium and acoustic vibrations set up within the transmission medium.

An example of a known acousto-optic device is the Bragg cell, which comprises a light transmitting cell in which acoustic vibrations (in the form of travelling waves) are set up by a transducer attached to one face of the cell.

The acoustic vibrations cause a periodic perturbation in the refractive index of the cell material, as the material is successively compressed and rarefied. These periodic perturbations act as a travelling diffraction grating within the cell. In operation, light incident on the cell at the so-called Bragg angle (a known function of the light's wavelength and the period of the diffraction grating) is diffracted by the travelling grating. This changes the direction of propagation of the light. In addition, because the grating is travelling through the cell (with the travelling acoustic vibrations), the diffracted light is also Doppler shifted, so that the frequency of the light is altered by an amount equal to the frequency of the acoustic vibrations. When the acoustic vibrations are removed, the light is not diffracted and emerges from the cell substantially unchanged.

In this way, the Bragg cell can operate to shift the frequency of incident light, to change the direction of propagation of the incident light (thereby acting as a switch) or to provide frequency or amplitude modulation of the incident light. However, the Bragg cell has the significant disadvantage that it is an expensive and complex bulk optical device. It is difficult to employ a Bragg cell in an optical fibre system, since the optical fibres have to be mechanically "pig-tailed" to the cell. This can lead to an insertion loss of 5 to 6 dB (decibels), which can be a major problem in, for example, an optical fibre communication system where the distance and speed of communication can depend on the optical power available at the communication receiver. A further disadvantageous feature of the Bragg cell is that a high electrical power (for example, of the order of 1 Watt), is required to drive the acoustic transducer. This is because a large proportion of the cell must be driven with the acoustic vibrations, although the actual overlap (volume of interaction) between the light and the acoustic vibrations occupies only a small proportion of the cell.

As an alternative to the Bragg cell, it has been proposed to propagate light along an optical fibre having two light transmission modes, and to induce flexural acoustic vibrations in the fibre to couple light from one of the fibre modes to the other. The two modes may be two different spatial modes of a dual-mode fibre (for example the so-called $LP_{11}$ and $LP_{01}$ modes), the two orthogonal polarisation modes of a birefringent fibre, or the so-called supermodes of a dual-core fibre.

These optical fibre acousto-optic devices make use of the fact that the two modes propagate at different velocities along the optical fibre, setting up a spatial beating between the two modes along the fibre length. When the "beat length" matches the wavelength of a flexural vibration applied to the fibre, there is resonant coupling of light from one of the modes into the other, with frequency shifting also taking place as described above. Mode filtering can then be used to isolate the desired (frequency shifted) mode.

Fibre acousto-optic devices of this type are generally more suitable than the Bragg cell for use in an all-fibre system. However, the maximum acoustic frequency that can be applied is limited by the fibre dimensions, and is typically restricted to about 10 MHz (megahertz). The light is generally confined to the fibre core, but the acoustic wave must cause vibration of the entire fibre. This means that although the electrical power requirement tends to be lower than that needed to drive a Bragg cell, it is still relatively high (of the order of 100 mW (milliwatts)). It may be necessary to splice conventional single mode fibres (commonly used in communication systems) to specialised (in this case, dual-mode) fibres within the acousto-optic device, leading to insertion losses. The acoustic frequency of operation at a given optical wavelength is fixed by the properties of the fibre and cannot be altered without fabricating a new fibre. Finally, if no acoustic power is applied, these devices do not give a light output.

SUMMARY OF THE INVENTION

This invention provides an optical device comprising: an optical fibre directional coupler having at least a first optical fibre optically coupled at a coupling region to a second optical fibre such that light can propagate in the coupling region in at least two possible electromagnetic transmission modes; and means for transferring energy between the transmission modes by a spatially periodic perturbation of at least a part of the coupling region.

The invention addresses the above problems by providing an all-fibre optical device, in which a spatially periodic perturbation (e.g. a mechanical vibration such as flexural or torsional vibration or a temporally non-periodic flexure or corrugation induced by an electric field) overlaps significantly with light propagating through the device. The device can be constructed from standard optical fibres, rather than requiring specialised (e.g. dual-mode) fibres to be used. This means that the device can easily be connected to other optical fibres and that the electrical power requirements can be very much lower than with previously proposed devices.

The skilled man will appreciate that the term 'directional coupler' is well known and encompasses a variety of optical couplers in which input light is or can be directed, in varying proportions, to a number of possible output ports. A number of examples below refer to a 2×2 coupler; however, it will be appreciated that the invention is applicable to couplers having larger or different numbers of ports.

In one preferred embodiment, the transferring means comprises means for exciting acoustic vibrations of at least the part of the coupling region. Such an acousto-optic device according to embodiments of the invention can be used in a number of ways. For example, if a standard 2×2 directional coupler made from identical fibres is used, the acoustic vibration can cause an oscillatory output between the two output ports at twice the acoustic frequency. This advantageous modulating effect arises because two transmission modes are excited in the coupling region; the acoustic vibration can cause a rapid energy transfer between the modes, with complementary frequency shifts (up and down) for light in the two modes. Temporal beating then occurs between these frequency-shifted outputs. Alternatively, as described below, a so-called 'null coupler' could be used, to provide one output port from which unshifted light is output and another output port from which frequency shifted light is output.

The design is versatile because the nature of the coupling region can be decided when the taper coupler is made. The device can be operated at acoustic frequencies of up to hundreds of megahertz because the diameter of the coupling region can easily be made as small as about 1 $\mu$m (micrometer). A device with a smaller diameter coupling region can be driven at higher operating acoustic frequencies.

Although other forms of acoustic vibration can cause the transfer of energy between the transmission modes, it is preferred that the acoustic vibrations comprise flexural vibrations of the coupling region.

Preferably, when the acoustic vibration is not excited, less than half of light propagating along one of the optical fibres is coupled into the other of the optical fibres.

Although couplers may be used in which, for example, two fibres are polished or etched close to the core before being attached to one another to form a coupling region, it is preferred that the coupler is a fused optical fibre coupler.

In particular, it is preferred that the fused optical fibre coupler is a fused taper null coupler whereby, when the flexural vibration is not excited, substantially none of the light propagating along one of the optical fibres is coupled into the other of the optical fibres. Null couplers are generally formed of dissimilar fibres and have a substantially zero transfer ratio across a range of operating wavelengths and coupling region lengths while tending not to exhibit the usual periodic variation of coupling ratios with these quantities. In fact, this is an indication, during fabrication, that a null coupler has been fabricated; test light supplied to the input ports is monitored at the output ports, and a null coupler has been fabricated if the detected coupling ratio is substantially zero and substantially independent of an increment in the length of the coupling region, despite the two fibres being fused together at a coupling region narrower than either fibre.

When the acoustic vibration is applied in this case, at least some of the light launched into one fibre can be coupled into a transmission mode corresponding to the other fibre. In this way, frequency-shifted and unshifted light can be arranged to leave the device from different output ports. No mode convertors or filters are therefore necessary to separate shifted and unshifted waves; any residual unshifted light can be made to emerge from the fibre into which the light was launched.

It is preferred that the coupling region has a narrower cross section than either of the first and second optical fibres. In this way, the light can be guided by the cladding-air interface, rather than the core-cladding interface of either or any of the fibres.

An advantageously convenient way of fabricating a null coupler is to employ optical fibres of different cross sectional areas. These may thus be mis-matched fibres; however, alternatively one, both or all of initially identical optical fibres can be pretreated (for example by pre-tapering or elongating, etching or polishing) before the coupler is fabricated, the pre-treatment altering the optical characteristics of the coupling region.

Preferably, the coupler is arranged (as in the case of a null coupler) such that light propagating into the coupling region from one of the first and second optical fibres excites a respective transmission mode in the coupling region, the excited transmission mode being associated with that optical fibre. A further advantageous preferred feature which facilitates the use of the device as a switch is where light propagating in each transmission mode in the coupling region emerges predominantly from a respective output port of the coupler associated with that transmission mode.

In order to avoid unwanted acoustic reflections along the fibres, it is preferred that one or more acoustic absorbing mounting blocks are attached to the optical fibres at respective positions disposed away from the coupling region.

For similar reasons, it is also preferred that at least a part of at least one of the optical fibres has an acoustic absorbing coating.

For compatibility with many current communication (and other) optical systems, it is preferred that at least one of the optical fibres is a single mode optical fibre.

It is preferred that the means for exciting comprises a vibration transducer operable to vibrate in response to an oscillatory electrical signal applied to the transducer. Although, for example, the vibrations could be excited by a magnetic transducer interacting with a magnetic or metallic element or coating associated with the fibres, it is preferred that the vibration transducer is a piezoelectric transducer.

Preferably, vibrations generated by the transducer are applied to the first fibre and the second fibre at a connection region disposed away from the coupling region.

In order to allow a transducer which is larger than the optical fibres to be used efficiently, it is preferred that the means for exciting comprises a tapered transmission member linking the transducer and the connection region.

Preferably the coupling region has a substantially uniform cross section along at least a part of the length of the coupling region. However, in other embodiments, the cross section of the coupling region may be made deliberately to vary (e.g. to reduce steadily) in order to broaden or 'smear' the frequency response of the acousto-optic device.

In another preferred embodiment, the transmission of light in the coupling region modes can be affected by a spatially but not temporally periodic perturbation of at least the part of the coupling region. Although such a perturbation could be produced mechanically, in a preferred form of the device at least the part of the coupling region is charged with a permanent electric charge; and the transferring means comprises means for generating a spatially periodic electric field, the electric field interacting with the permanent electric charge to cause spatially periodic perturbation of at least the part of the coupling region. (Alternatively of course, a spatially periodic permanent electric charge on the coupling region could be affected by a substantially uniform electric field.)

This electro-static device does not provide frequency shifting of input light, but can be used in an optical switching or modulating arrangement. Although the term "electro-static" is used, it will be clear that the term refers merely to the method of interaction used to generate the distortion of the coupling region; the skilled man will appreciate that the electric field could be switched on and off rapidly if the device is used as, for example, a modulator.

Preferably the generating means comprises at least a pair of interdigital electrodes connectable to a voltage source.

It is also preferred that the generating means comprises a ground plane, the ground plane and the pair of interdigital electrodes being disposed on opposite sides of the coupling region. Alternatively, further interdigital electrodes (or none at all) could be used on the other side of the coupling region.

In a further alternative embodiment a spatially periodic perturbation can be permanently imposed on the coupling region using, for example, heat treatment by an excimer laser.

Preferably the coupler is a 2×2 coupler.

A device according to the invention is particularly suitable for use as: an optical frequency shifter; an optical tunable filter; an optical switch or an optical modulator.

This invention also provides an acousto-optic device comprising: an optical fibre directional coupler having at least a first optical fibre optically coupled at a coupling region to a second optical fibre such that light can propagate in the coupling region in at least two possible electromagnetic transmission modes; and means for exciting acoustic vibration of at least a part of the coupling region to effect energy transfer between the transmission modes.

This invention also provides a method of fabrication of an acousto-optic device, the method comprising the steps of: fabricating an optical fibre directional coupler having at least a first optical fibre optically coupled at a coupling region to a second optical fibre such that light can propagate in the coupling region in at least two possible electromagnetic transmission modes; and providing means for exciting acoustic vibration of at least a part of the coupling region to effect energy transfer between the transmission modes.

This invention also provides a method of acousto-optically frequency-shifting light, the method comprising the steps of: directing the light into an optical fibre directional coupler having at least a first optical fibre optically coupled at a coupling region to a second optical fibre such that light can propagate in the coupling region in at least two possible electromagnetic transmission modes; and exciting acoustic vibration of at least a part of the coupling region to effect energy transfer between the transmission modes.

This invention also provides a method of fabrication of an optical device, the method comprising the steps of: fabricating an optical fibre directional coupler having at least a first optical fibre optically coupled at a coupling region to a second optical fibre such that light can propagate in the coupling region in at least two possible electromagnetic transmission modes; and providing a spatially periodic perturbation of at least a part of the coupling region to effect energy transfer between the transmission modes.

This invention also provides a method of optical switching, the method comprising the steps of: directing the light into an optical fibre directional coupler having at least a first optical fibre optically coupled at a coupling region to a second optical fibre such that light can propagate in the coupling region in at least two possible electromagnetic transmission modes, light propagating in each mode emerging at least predominantly from a respective output port of the coupler; and generating a spatially periodic perturbation of at least a part of the coupling region to effect energy transfer between the transmission modes.

This invention also provides an optical switch comprising: an optical fibre directional coupler having at least a first optical fibre optically coupled at a coupling region to a second optical fibre such that light can propagate in the coupling region in at least two possible electromagnetic transmission modes, light propagating in each mode emerging at least predominantly from a respective output port of the coupler; and means for generating a spatially periodic perturbation of at least a part of the coupling region to effect energy transfer between the transmission modes.

This invention also provides an optical device comprising: an optical fibre directional coupler having at least a first optical fibre coupled at a coupling region to a second optical fibre; and means for generating spatially periodic perturbation of at least a part of the coupling region.

It will be appreciated that preferred features of the invention described in the present application in relation to the device itself are equally applicable to other aspects or embodiments of the present invention, and vice-versa. Similarly, the preferred forms of coupler described with relation to one embodiment (e.g. the acousto-optic embodiment described above) are equally applicable to other embodiments (e.g. the electro-static embodiment described above).

BRIEF DESCRIPTION OF THE DRAWINGS

An embodiment of the invention will now be described, by way of example only, with reference to the accompanying drawings, throughout which like parts are referred to by like references, and in which.

DETAILED DESCRIPTION

Figure 1:
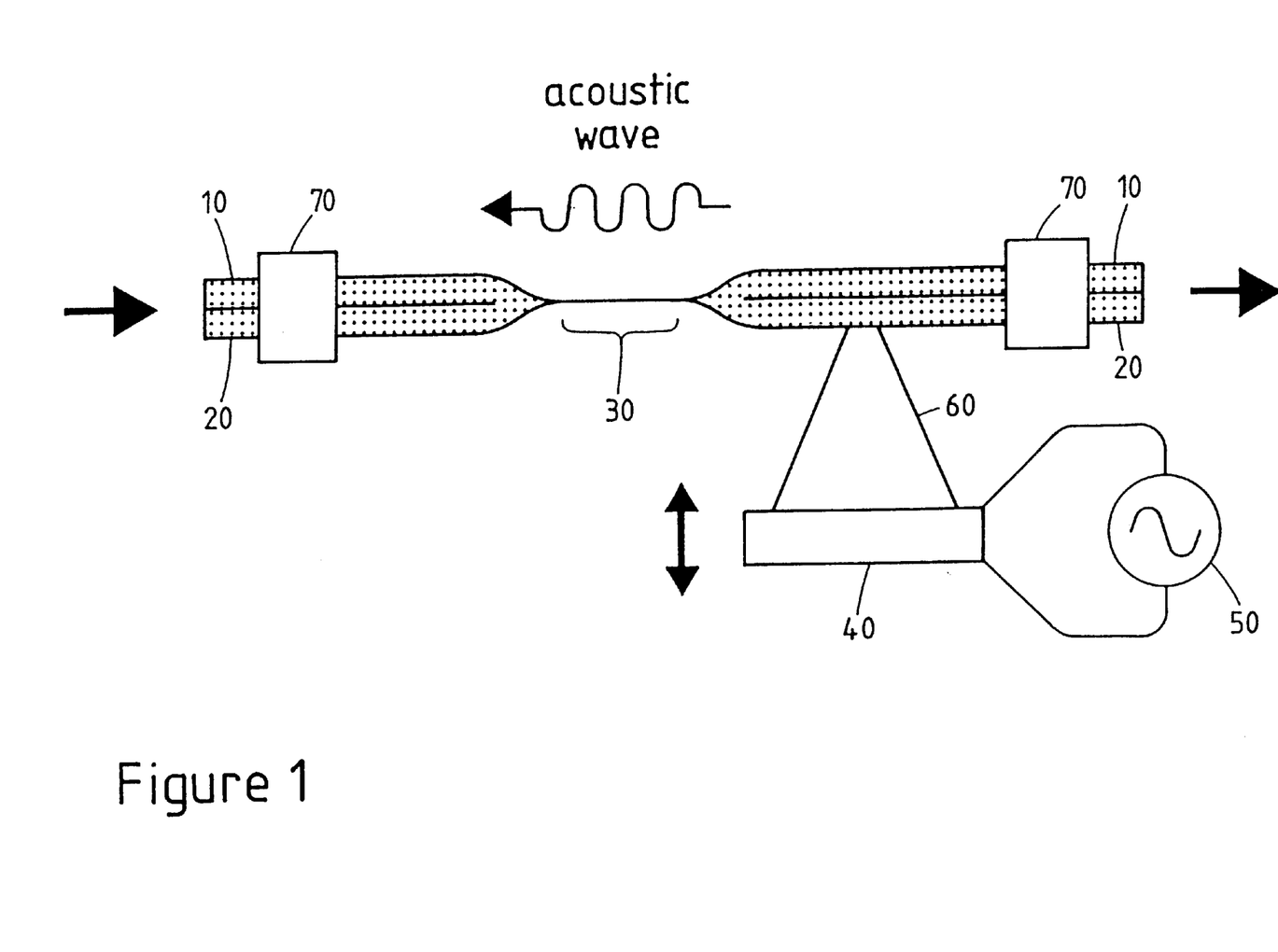
FIG. 1 is a schematic diagram of an acousto-optic device.

Referring now to FIG. 1, an acousto-optic device comprises an optical fibre directional coupler in which two optical fibres 10, 20 are coupled at a coupling region 30. The coupler is a so-called fused taper null coupler, which will be described below with reference to FIGS. 2a and 2b.

A piezo-electric ceramic disc transducer 40 (alternatively referred to as a 'PZT' element) is driven to vibrate by a radio frequency (RF) signal generator 50. The vibrations of the transducer 40 are delivered to the optical fibres 10, 20 by a conical (or tapered) aluminum concentrating horn 60 which is epoxied to the transducer 40 and attached to the optical fibres 10, 20 away from the coupling region 30 by a small joint (not shown) formed of ultraviolet-curing adhesive. The vibrations of the transducer 40, concentrated by the horn 60, excite flexural vibration of the optical fibres 10, 20, and in particular of the coupling region 30. The vibrations are substantially absorbed by mounting blocks 70, thus avoiding unwanted reflection of the vibrations along the optical fibres 10, 20. An acoustic-absorbing buffer coating may also be applied to the fibres 10, 20 away from the coupling region 30.

Figure 2A:
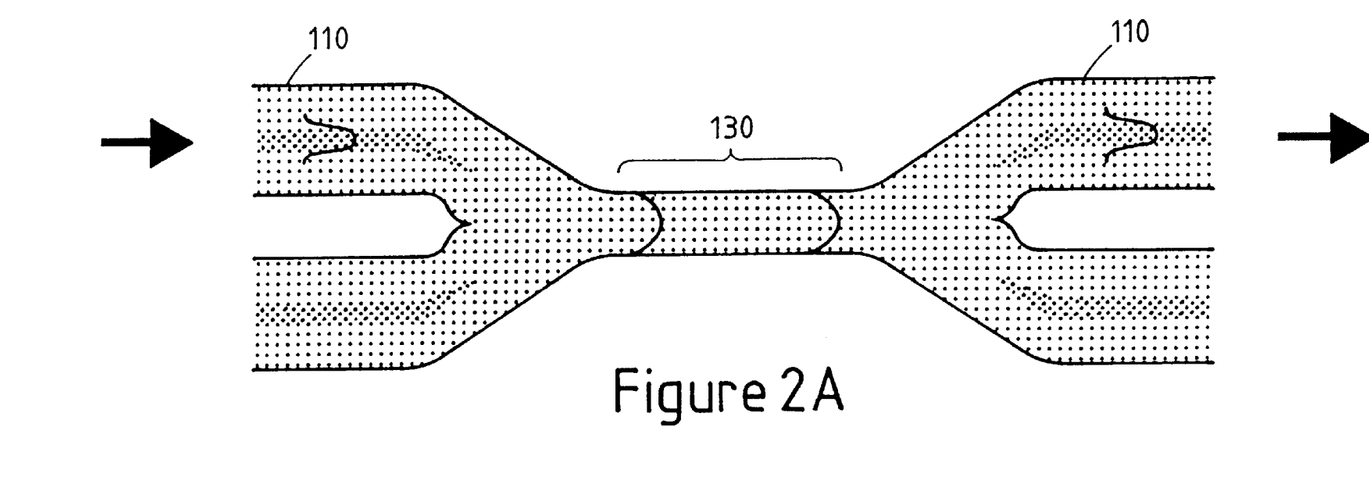
FIGS. 2a and 2b are schematic diagrams illustrating the operation of a so-called 'null' optical fibre coupler.
Figure 2B:
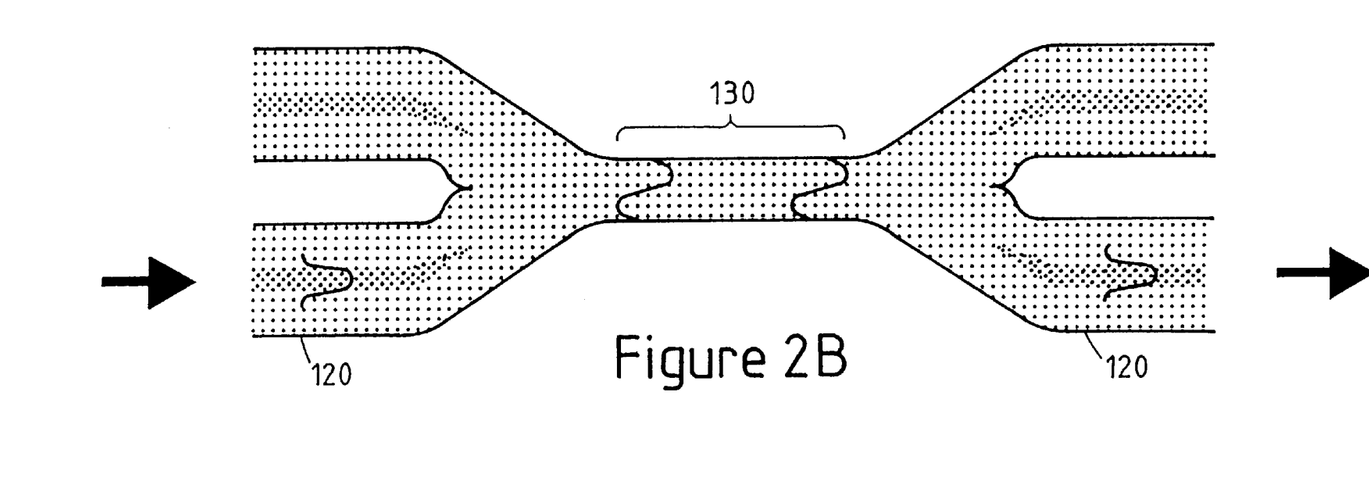

FIGS. 2a and 2b illustrate the operation of a null taper coupler.

A fused taper coupler, or beam-splitter, is made by heating and stretching two parallel optical fibres together in a small flame. In general, some of the light entering the coupler in one fibre is cross-coupled to the other fibre (the coupled wave), while the rest remains in the first fibre (the through-put wave).

If the coupler is made from a pair of identical single-mode fibres, any cross-coupling ratio (the amount of light transferred from one fibre to the other or others) from substantially 0% to the maximum of substantially 100% is possible. With dissimilar fibres such as fibres of different cross-sectional areas (or if one or both of two initially identical fibres is pre-treated, for example by pre-tapering or elongating, etching or polishing, before the coupler is fabricated), the maximum cross-coupling can be deliberately made to be less than 100%. An ideal null coupler is one in which the fibres are so dissimilar that the maximum cross-coupling ratio is substantially zero over a wide range of wavelengths; that is, the passive coupler does not function as a beam-splitter at all.

In other words, null couplers are generally formed of dissimilar fibres and have a substantially zero transfer ratio across a range of operating wavelengths and coupling region lengths while tending not to exhibit the usual periodic variation of coupling ratios with these quantities. In fact, this is an indication, during fabrication, that a null coupler has been fabricated; test light supplied to the input ports is monitored at the output ports, and a null coupler has been fabricated if the detected coupling ratio is substantially zero and substantially independent of an increment in the length of the coupling region, despite the two fibres being fused together at a coupling region narrower than either fibre.

The pre-treatment of the fibre need not necessarily alter the optical properties of the fibre before it is used in fabrication of the coupler. However, the pre-treatment alters the eventual optical properties of the coupling region after the coupler has been made.

In order to explain the operation of a null coupler, an example of a null coupler is illustrated in FIGS. 2a and 2b, in which two optical fibres 110, 120 are coupled at a narrowed coupling region (the coupler waist) 130. The stretching operation performed during fabrication of the coupler means that the diameter of the coupling region is very much less than the fibre diameter away from the coupling region.

The coupling region 130 supports at least two light transmission modes, illustrated in FIGS. 2a and 2b by different schematic field distributions within the coupling region. Because the diameter of the coupling region is small, these modes are effectively confined by the cladding/air interface, rather than being confined by the fibre core. In a null coupler, light in one fibre 110 evolves adiabatically into the fundamental mode of the coupler waist 130 (FIG. 2a), returning to the same fibre 110 at the far end of the coupler. Similarly, light in the other fibre 120 evolves into the second mode of the waist (FIG. 2b), and emerges from the same fibre 120.

In the present embodiment, acousto-optic interactions occur in the narrow waist of a tapered single-mode fibre coupler. The taper waist acts as a multi-mode waveguide, supporting at least two transmission modes which fill the fibre.

Figure 3A:
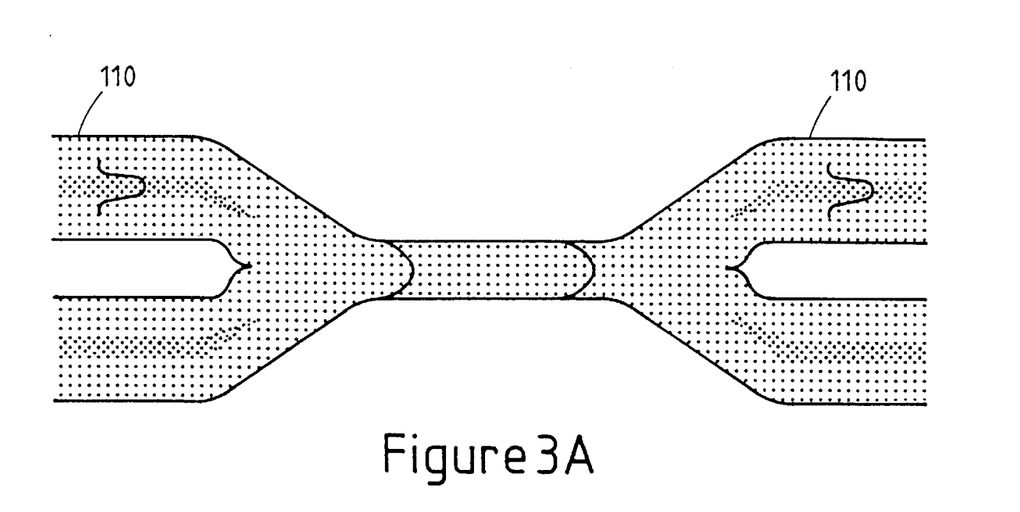
FIGS. 3a and 3b are schematic diagrams illustrating the operation of the acousto-optic device of FIG. 1.
Figure 3B:
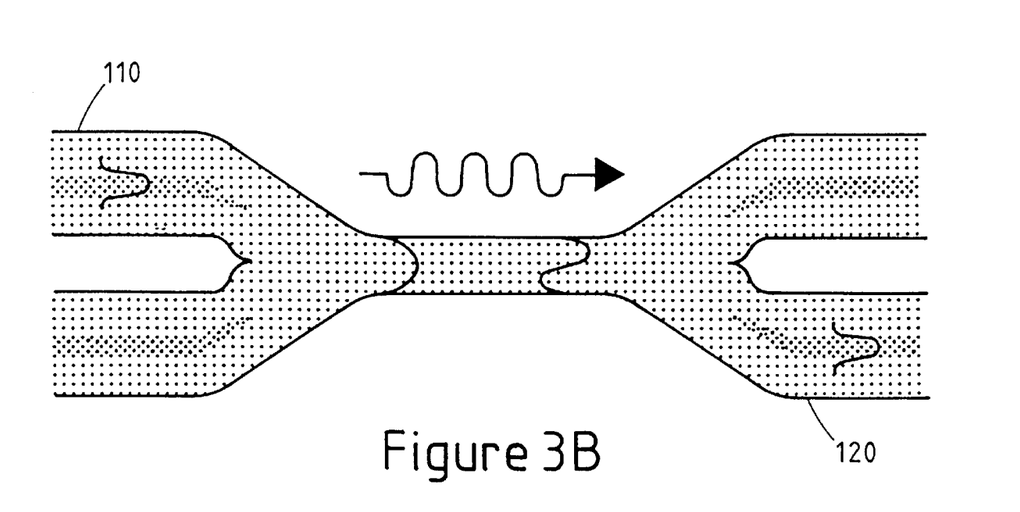

FIGS. 3a and 3b are schematic diagrams illustrating the coupling of light from one mode to another in the coupling region 130 of the coupler illustrated in FIGS. 2a and 2b.

As shown in FIG. 3a, in the absence of an applied acoustic flexural vibration, light launched into one of the fibres (e.g. the fibre 110) emerges substantially unchanged from the same fibre 110. In other words, the operation shown in FIG. 3a is identical to that shown in FIG. 2a above.

Despite the lack of interaction between the light waves in the two fibres, they strongly interpenetrate and overlap at the coupler waist. A travelling flexural acoustic wave can cause resonant forward-coupling between the fundamental and second modes of the coupler waist, with a frequency shift, if the beat-length of the two modes matches the acoustic wavelength.

The two modes propagate at different velocities along the coupling region, setting up a spatial beating between the two modes along the length of the coupling region. When the "beat length" matches the wavelength of a flexural vibration applied to the coupling region, there is resonant coupling of light from one of the modes into the other, with frequency shifting also taking place.

In other words, if a flexural acoustic vibration is applied, light entering the coupling region in the fundamental mode can be coupled to the second mode (and vice versa), with a frequency-shift. This process is illustrated schematically in FIG. 3b.

There is a substantially complete overlap between the acoustic and optical waves, and hence a very low acoustic power is required. This contrasts with the previously proposed optical fibre acousto-optic devices described earlier.

The design is versatile because the nature of the coupling region 130 can be decided when the taper coupler is made. The device can be operated at acoustic frequencies of up to hundreds of megahertz because the waist diameter can be made as small as about 1 $\mu$m (micrometer).

Light in the two transmission modes emerges via different fibres; this means that the shifted and unshifted waves leave from different ports. No mode convertors or filters are therefore necessary to separate shifted and unshifted waves; any residual unshifted light emerges from the fibre into which the light was launched.

FIGS. 4 to 7 illustrate the results of tests performed on a prototype acousto-optic device of the form described above.

The prototype acousto-optic device was constructed for use at a wavelength ($\lambda$) of 633 nm (nanometres) using a pair of dissimilar silica fibres having diameters of 60 $\mu$m and 80 $\mu$m, cut-off wavelengths of 500 nm and 650 nm, and numerical apertures of 0.26 and 0.21 respectively. The second of these fibres is not single-mode at 633 nm, so for the purpose of testing the prototype device light was launched into the first-mentioned fibre only. However, other devices could be constructed in which both fibres are single-mode at the wavelengths of interest.

The fibres were held together in parallel and then heated and stretched together in a travelling oxy-butane flame. The final waist section of the coupling region was about 25 mm (millimetres) long, of substantially uniform cross section, and about 6 $\mu$m (micrometres) in diameter, with short taper transitions each about 25 mm long. These dimensions were controlled, in accordance with conventional coupler fabrication techniques, by varying the flame's travel distance during coupler elongation. The fabrication of couplers by these techniques, and in particular the control of the dimensions of the coupling region, are described in the article "The Shape of Fiber Tapers" (Journal of Lightwave Technology, Vol. 10, No. 4, April 1992 pages 432 to 438).

The waist cross-section was substantially circular; this gives a good overlap between the two optical modes, is reproducible, and resembles the waist of a single tapered fibre (with the same resonance equation).

The waist cross-section was substantially uniform along the length of the coupling region. However, a non-uniform waist could be used. For example, the cross section of the coupling region may be made deliberately to vary (e.g. to reduce steadily) in order to broaden or 'smear' the frequency response of the acousto-optic device.

The excess loss of the prototype device was about 0.1 dB and the maximum cross-coupling ratio was 1:400.

As described above, a flexural acoustic wave was excited in the coupler waist using a PZT disc with a concentrator horn, driven by an amplified RF signal. The horn was fixed to the pair of untapered fibres at one end of the coupler, in such a way that the plane of the acoustic wave coincided with the plane common to both fibres in the coupler. This arrangement has the advantage that the acoustic power tends to be focused as it travels into the taper waist.

Light at 633 nm from a polarised HeNe (Helium-Neon) laser was launched into one input fibre of the coupler via a conventional optical fibre polarisation controller. The optical powers emerging from the two output fibres were monitored, while a resonance was sought by changing the frequency of the RF drive. For the prototype device, an acousto-optic resonance was found for the acoustic frequency of 1.851 MHz.

Figure 4:
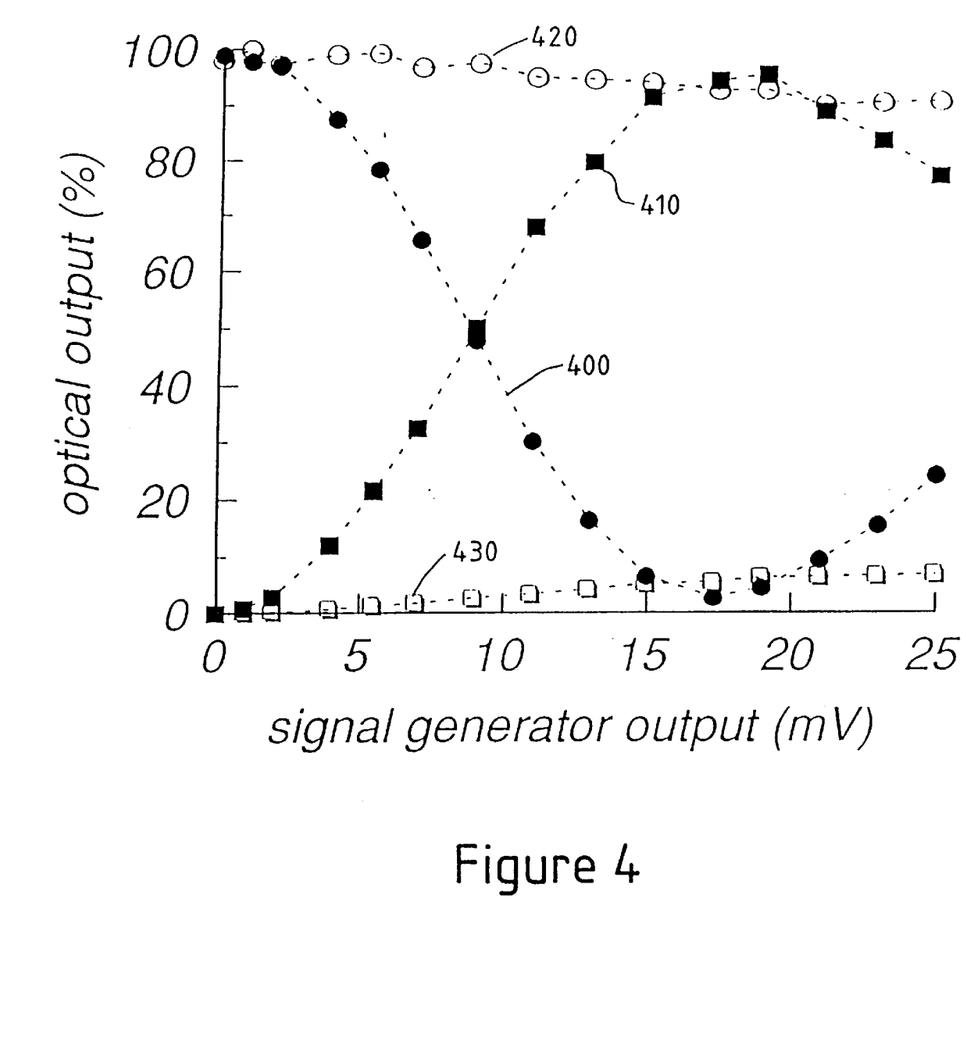
FIG. 4 is a graph showing optical output plotted against radio-frequency (RF) signal generator voltage for a prototype acousto-optic device.

FIG. 4 is a graph showing optical output plotted against RF signal generator voltage (that voltage being amplified by a voltage gain of 500 before being used to drive the transducer 40). In FIG. 4, a curve 400 (solid circles) illustrates the "throughput" optical output (light emerging from the device in the same fibre as the fibre in which the light was delivered to the device), and a curve 410 (solid squares) illustrates the "coupled" optical output (light coupled from one fibre to the other by the device). Both of the curves 400, 410 relate to one input polarisation state; the corresponding outputs for an orthogonal state are illustrated by curves 420 (open circles) and 430 (open squares) respectively.

With suitable polarisation control, over 99% acousto-optic coupling into the second fibre was achieved by the prototype device. Although one of the fibres used in the prototype device was not single-mode, it was found that the coupled light was carried in its fundamental mode. The RF power required for maximum coupling was as low as 1 mW, much less than for the previous frequency shifters. The theoretical lower limit of the acoustic power required is 170 nW.

The frequency shift provided by the prototype device was measured by inserting the device (taking the output from the second fibre) into one arm of a Mach-Zehnder interferometer. A Bragg cell was used to up-shift (frequency shift) the light in the other arm by 80 MHz. A beat signal was detected and was monitored on an RF spectrum analyzer.

Figure 5:
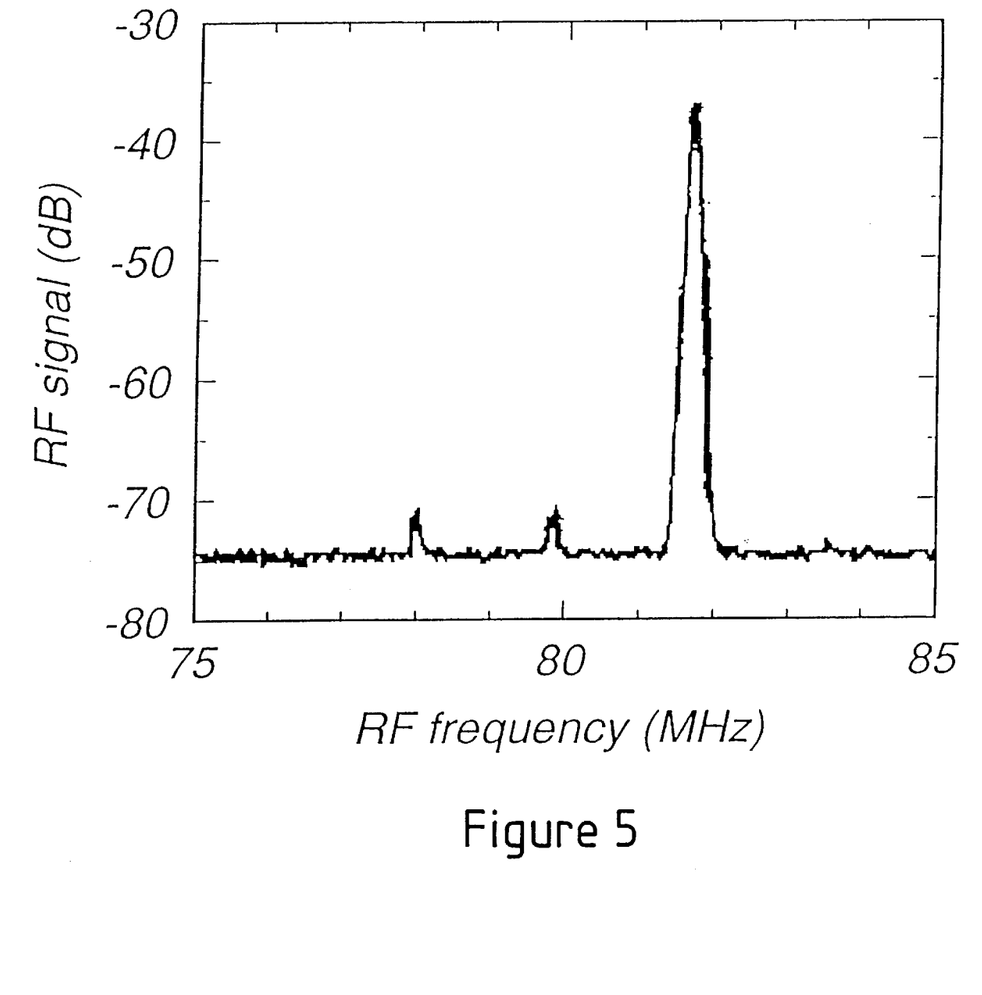
FIG. 5 is a graph illustrating the spectrum of a detected beat signal during tests of the prototype acousto-optic device.

FIG. 5 illustrates the spectrum of the detected beat signal between light output by the prototype device and light up-shifted by 80 MHz in a Bragg cell. The main beat component is visible near 82 MHz, corresponding to a frequency down-shift equal to the acoustic frequency. Also visible above the noise floor are beat components with the carrier frequency (80 MHz) and the image sideband (near 78 MHz). These are both about 30 dB lower in level than the principal component. The purity of this output was little changed when the drive voltage was reduced from the value for maximum conversion, though of course the total amount of light dropped. The output from the first fibre was unshifted, as expected.

In order to measure the behavior of the device as an optical filter, unpolarised white light was launched into the input fibre, and the outputs were fed to an optical spectrum analyzer. The normalised power spectra obtained for an acoustic frequency of 1.860 MHz are illustrated in FIGS. 6 (throughput light) and 7 (coupled light).

Figure 6:
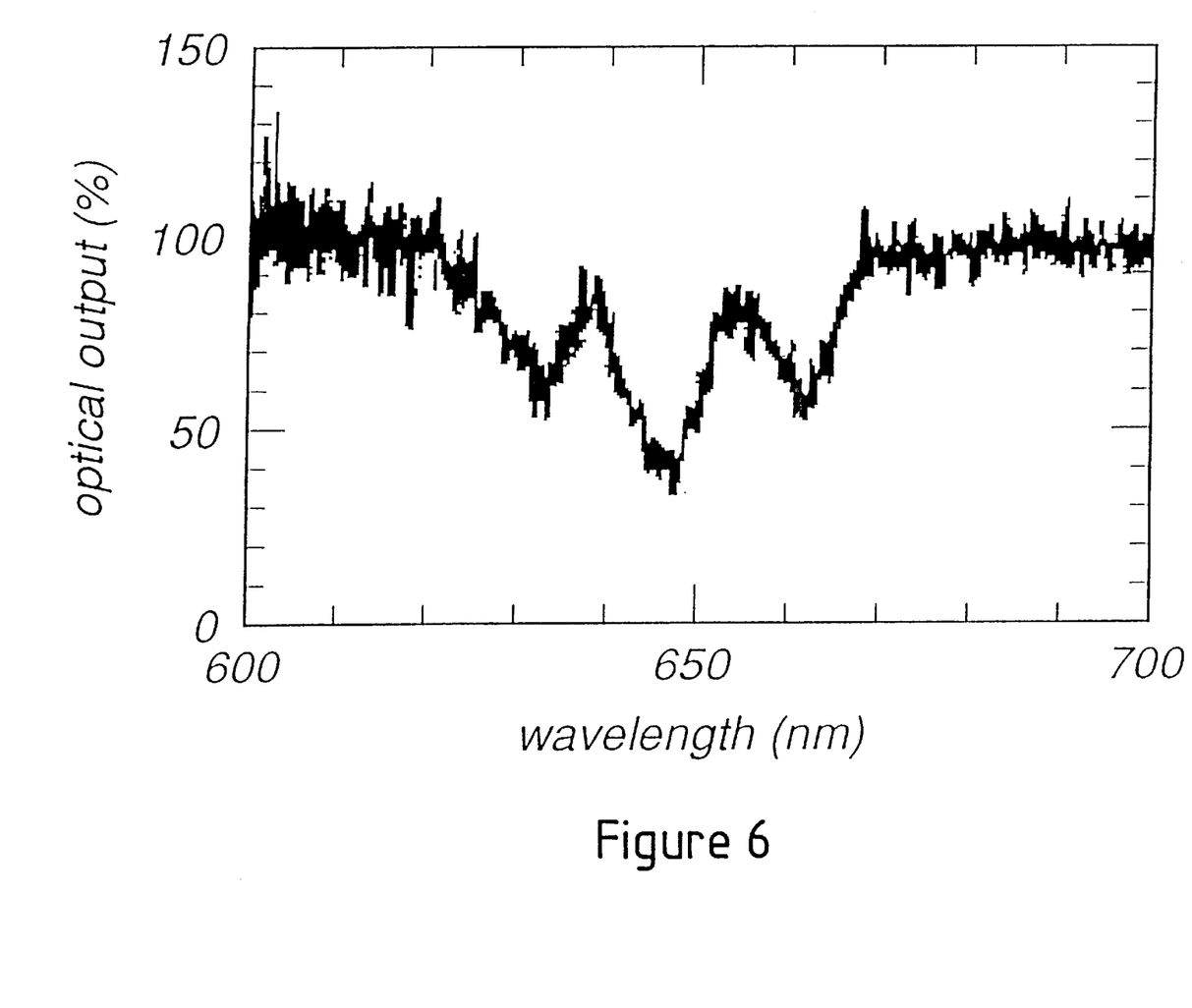
FIGS. 6 and 7 illustrate output spectrum of the prototype acousto-optic device when unpolarized white light was launched into the device.
Figure 7:
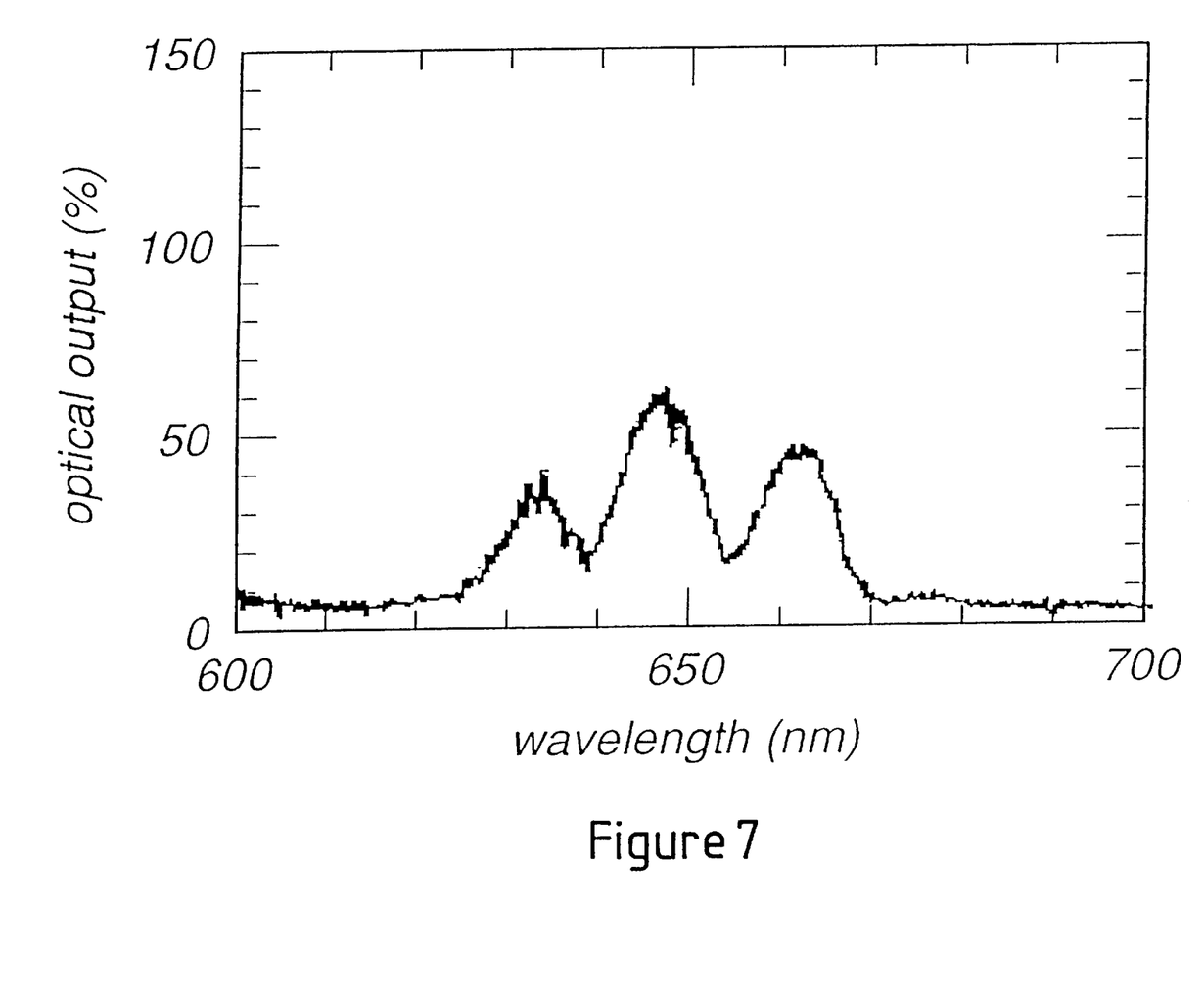

The spectra illustrated in FIGS. 6 and 7 are complementary, as expected by the requirements of power conservation; the device acts as a notch filter in the throughput path, and as a band-pass filter in the coupled path. The three-peaked structure of the spectra is believed to be due to the polarisation properties of the second mode. The 10 nm width of each peak is greater than the expected width of 3.5 nm. A longitudinal non-uniformity of 0.02 μm in the diameter of the coupler waist is sufficient to account for this.

In other words, FIGS. 6 and 7 illustrate the way in which the acousto-optic device can act as a tunable filter. The center of the peaks and troughs (notches) in FIGS. 6 and 7 is dependent on the applied acoustic frequency. Accordingly, a tunable optical filter comprises an acousto-optic device, with the transducer being driven by a variable frequency RF signal generator.

The acousto-optic device may clearly be used as a frequency shifter, since in the embodiment described above frequency-shifted light emerges from a dedicated output port. If the acoustic vibration is switched on and off, the respective shifted and unshifted outputs from the device exhibit corresponding changes in intensity (i.e. the device operates as an optical switch). If the acoustic vibration is modulated, the outputs of the device are also modulated, so the device functions as an optical modulator.

Frequency shifts of up to hundreds of MHz are possible with embodiments of the invention by using a narrower coupler waist. Operation at communications wavelengths is straightforward by a suitable choice of a pair of fibres. A device with four identical single-mode ports is possible, for example by pre-treating (as described above) one or both of a pair of identical fibres prior to coupler fabrication, to make the pair sufficiently dissimilar to yield a null coupler. Multiple fibres, rather than just a pair of fibres, may be formed into a multi-port fused taper coupler and used in a further embodiment of an acousto-optic device.

It is not necessary to use a null coupler in embodiments of the invention. For example, if a standard 2×2 directional coupler made from identical fibres is used, the acoustic vibration can cause an oscillatory output between the two output ports at twice the acoustic frequency. This modulating effect arises because two transmission modes are excited in the coupling region; the acoustic vibration can cause a rapid energy transfer between the modes, with complementary frequency shifts (up and down) for light in the two modes. Temporal beating then occurs between these frequency-shifted outputs.

The embodiments described above use an acoustic transducer to impose a perturbation on the coupling region which is periodic both spatially and temporally. However, energy transfer between the transmission modes in the coupling region can be obtained by imposing only a spatially periodic perturbation on the coupling region.

Figure 8:
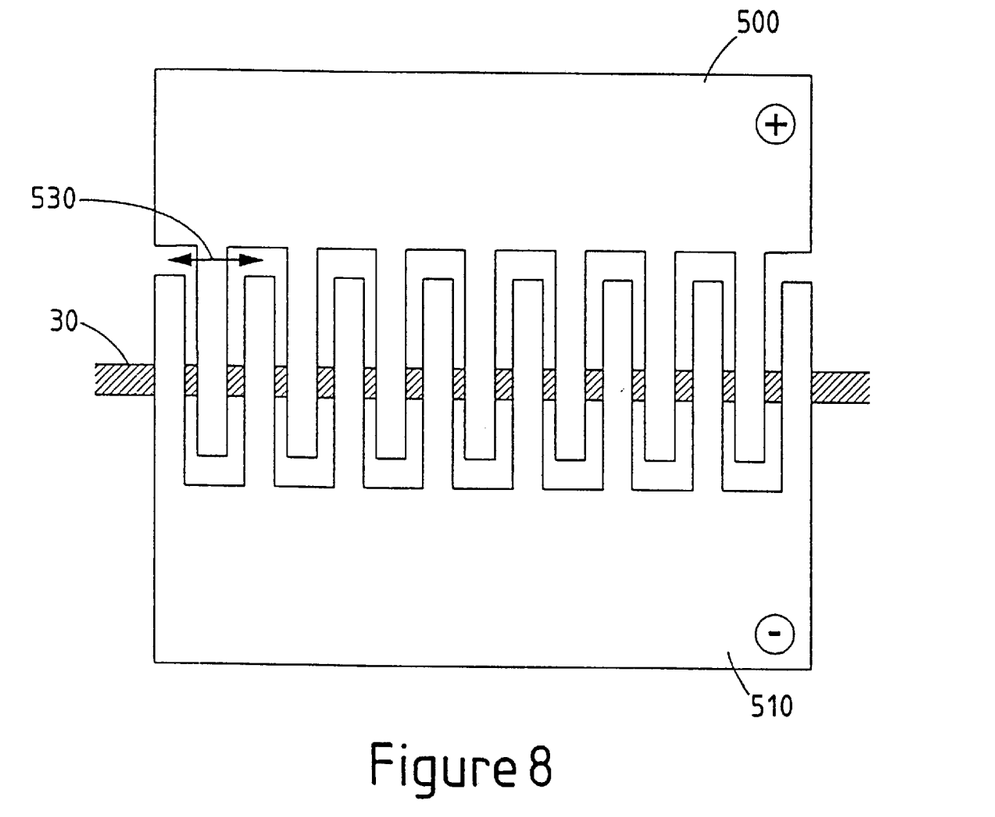
FIG. 8 is a schematic plan view of a second embodiment of an optical device.

FIG. 8 is a schematic illustration of one technique for imposing a spatially periodic perturbation on the coupling region without using a temporally periodic travelling or standing acoustic wave.

In FIG. 8, the coupling region 30 of a coupler as described above is positioned to one side of a pair of interdigital electrodes 500, 510 connected to opposite polarity terminals of a switchable dc (direct current) voltage source. To the other side of the coupling region (i.e. beneath the coupling region as the apparatus is illustrated in FIG. 8) there is either a ground plane or a complementary pair of interdigital electrodes similar to the electrodes 500, 510. The relative positions of the electrodes 500, 510, the coupling region 30 of the fibre coupler, and the further electrodes or ground plane 520, are shown schematically in side elevation in FIG. 9.

The coupling region 30 is treated to apply a substantially permanent electric charge or "electret" charge to the fibre. This permanent electric charge could be of either polarity. The application of permanent electric charges to optical fibres is described in the reference "Optical fibre electrets: observation of electro-acoustic transduction", Electronics Letters 30, p1436, 1994.

Figure 9:
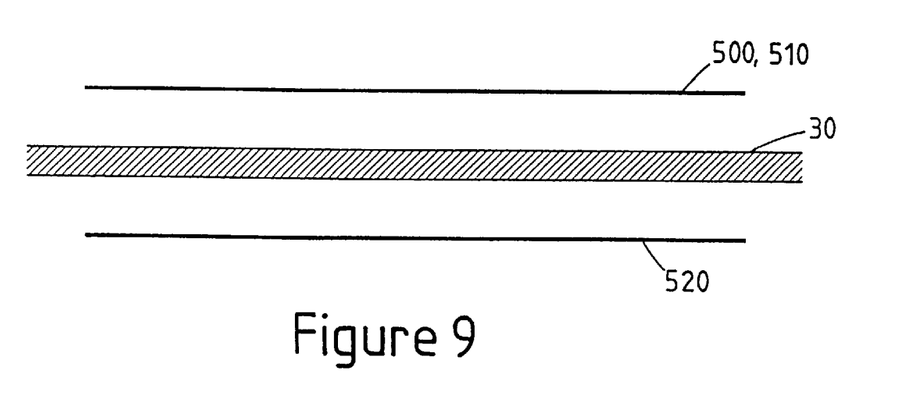
FIG. 9 is a schematic side elevation of the embodiment of FIG. 8.

The electrodes 500, 510 and the further electrodes or ground plane 520 generate a spatially periodic but temporally static electric field along the length of the coupling region 30, as long as the electrodes are connected to the dc voltage source. This field either attracts or repels portions of the fibre, depending on the polarity of the electric field at each point along the fibre, and so the fibre is distorted or corrugated periodically along its length.

The electrodes 500, 510 are arranged with a spacing 530 of the order of 2 mm between adjacent interdigital elements of each electrode. This provides a periodic lateral distortion of the coupling region with a period substantially equal to the electrode spacing. The perturbation can be switched on and off merely by energising the electrodes 500, 510.

Input light is coupled from one transmission mode into the other mode when the periodic perturbation is in place, so the coupler can then act as a electrically controlled optical switch, directing light into either of the output ports under the control of the electrode voltage.

An example of a set of parameters for use with the device of FIGS. 8 and 9 is as follows:

length of coupling region (coupler waist or interaction length): 50 mm optical wavelength used: 633 nm diameter of coupling region (presumed substantially uniform): 20 $\mu$m voltage applied to electrodes 500, 510: 110 volts total permanent electric charge on coupling region: $8.3 \times 10^{-11}$ Coulombs These values assume that the device is operated in a vacuum, with the electrodes 500, 510 placed as close as possible to the fibre coupling region.

In a further alternative embodiment, the coupling region could be permanently distorted by heat treatment with, for example, an excimer laser. The heat treatment involves directing the laser output onto regularly spaced spots along the coupling region, and effectively buckles portions of the coupling region to provide a spatially periodic perturbation of the coupling region. This arrangement would provide a coupler having a frequency dependent output into each output port (i.e. a filter or demultiplexer), but in contrast to the acoustic and electrostatic devices described above, the output would not be temporally switchable.

In conclusion, embodiments of the invention provide a simple and versatile design of low-power frequency shifter, which can be ready-made with four single-mode fibre ports.

We claim:

1. An optical device comprising:
   an optical fibre directional coupler having at least a first optical fibre (10) optically coupled at a coupling region (30) to a second optical fibre (20) such that light can propagate in the coupling region in at least two possible electromagnetic transmission modes; and
   means (40, 50, 60) for transferring energy between the transmission modes by exciting flexural acoustic vibration of at least a part of the coupling region.

2. A device according to claim 1, comprising one or more acoustic absorbing mounting blocks (70) attached to the optical fibres at respective positions disposed away from the coupling region.

3. A device according to claim 1, in which at least a part of at least one of the optical fibres has an acoustic absorbing coating.

4. A device according to claim 1, which the coupler is a fused optical fibre coupler.

5. A device according to claim 4, in which, with the transferring means switched off, less than half of light propagating along one of the optical fibres is coupled into the other of the optical fibres.

6. A device according to claim 1, in which light propagating into the coupling region from one of the first and second optical fibres excites a respective transmission mode in the coupling region, the excited transmission mode being associated with that optical fibre.

7. A device according to claim 1, in which light propagating in each transmission mode in the coupling region emerges predominantly from a respective output port of the coupler associated with that transmission mode.

8. A device according to claim 1, in which at least one of the optical fibres is a single mode optical fibre.

9. A device according to claim 1, in which the coupling region has a substantially uniform cross-sectional diameter.

10. A device according to claim 1, in which the coupling region has a narrower cross section than either of the first and second optical fibres.

11. A device according to claim 1, in which the coupler is a 2×2 coupler.

12. A device according to claim 1 in which the at least two electromagnetic transmission modes spatially overlap in the coupling region.

13. An optical frequency shifter comprising a device according to claim 1.

14. An optical tunable filter comprising a device according to claim 1.

15. An optical switch comprising a device according to claim 1.

16. An optical modulator comprising a device according to claim 1.

17. An optical fibre device comprising:
   an optical fibre directional coupler having at least a first optical fibre optically coupled at a coupling region to a second optical fibre such that light can propagate in the coupling region in at least two possible electromagnetic transmission modes; and
   a vibration transducer, operable to vibrate in response to an oscillatory electrical signal applied to the transducer, arranged to transfer energy between the transmission modes by exciting flexural acoustic vibration of at least a part of the coupling region.

18. A device according to claim 17, in which the vibration transducer is a piezoelectric transducer.

19. A device according to claim 17, in which vibrations generated by the vibration transducer are applied to the first fibre and the second fibre at a connection region disposed away from the coupling region.

20. A device according to claim 17, further comprising a tapered transmission member linking the vibration transducer and the connection region.

21. An optical fibre device comprising:
   an optical fibre fused taper null coupler having at least a first optical fibre optically coupled at a coupling region to a second optical fibre such that light can propagate in the coupling region in at least two possible electromagnetic transmission modes; and
   means for transferring energy between the transmission modes by exciting flexural acoustic vibration of at least a part of the coupling region;

whereby, with the transferring means inactive, substantially none of the light propagating along one of the optical fibres is coupled into the other of the optical fibres.

22. A device according to claim 21, in which the first and second optical fibres have different cross sectional areas.

23. A device according to claim 21, in which at least a portion of at least one of the first and second optical fibres was pre-treated before the coupler was fabricated, the pre-treatment altering the optical characteristics of the coupling region.

24. An optical device comprising:

an optical fibre directional coupler having at least a first optical fibre (10) optically coupled at a coupling region (30) to a second optical fibre (20) such that light can propagate in the coupling region in at least two electromagnetic transmission modes, and means (40, 50, 60) for transferring energy between the transmission modes by a spatially periodic perturbation of at least a part of the coupling region;

in which the coupler is a fused taper null coupler whereby, in the absence of the spatially periodic perturbation, substantially none of the light propagating along one of the optical fibres is coupled into the other of the optical fibres.

25. A device according to claim 24, in which the first and second optical fibres have different cross sectional areas.

26. A device according to claim 24, in which at least a portion of at least one of the first and second optical fibres was pre-treated before the coupler was fabricated, the pre-treatment altering the optical characteristics of the coupling region.

27. An acousto-optic device comprising:

an optical fibre directional coupler having at least a first optical fibre (10) optically coupled at a coupling region (30) to second optical fibre (20) such that light can propagate in the coupling region in at least two possible electromagnetic transmission modes; and means (40, 50, 60) for exciting flexural acoustic vibration of at least a part of the coupling region to effect energy transfer between the transmission modes.

28. A method of fabrication of an acousto-optic device, the method comprising the steps of:

fabricating an optical fibre directional coupler having at least a first optical fibre (10) optically coupled at a coupling region (30) to a second optical fibre (20) such that light can propagate in the coupling region in at least two possible electromagnetic transmission modes; and providing means (40, 50, 60) for exciting flexural acoustic vibration of at least a part of the coupling region to effect energy transfer between the transmission modes.

29. A method of acousto-optically frequency-shifting light, the method comprising the steps of:

directing the light into an optical fibre directional coupler having at least a first optical fibre (10) optically coupled at a coupling region (30) to a second optical fibre (20) such that light can propagate in the coupling region in at least two possible electromagnetic transmission modes; and exciting (40, 50, 60) flexural acoustic vibration of at least a part of the coupling region to effect energy transfer between the transmission modes.

30. A method of optical switching, the method comprising the steps of:

directing the light into an optical fibre directional coupler having at least a first optical fibre (10) optically coupled at a coupling region (30) to a second optical fibre (20) such that light can propagate in the coupling region in at least two possible electromagnetic transmission modes, light propagating in each mode emerging at least predominantly from a respective output port of the coupler; and generating (40, 50, 60) flexural acoustic vibration of at least a part of the coupling region to effect energy transfer between the transmission modes.

31. An optical switch comprising:

an optical fibre directional coupler having at least a first optical fibre (10) optically coupled at a coupling region (30) to a second optical fibre (20) such that light can propagate in the coupling region in at least two possible electromagnetic transmission modes, light propagating in each mode emerging at least predominantly from a respective output port of the coupler; and means (40, 50, 60) for generating flexural acoustic vibration of at least a part of the coupling region to effect energy transfer between the transmission modes.

* * * * *